US010184773B2

(12) United States Patent
Jansson

(10) Patent No.: US 10,184,773 B2
(45) Date of Patent: Jan. 22, 2019

(54) SENSOR SIGNAL OFFSET COMPENSATION SYSTEM FOR A CMM TOUCH PROBE

(71) Applicant: Mitutoyo Corporation, Kanagawa-ken (JP)

(72) Inventor: Bjorn E. B. Jansson, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 135 days.

(21) Appl. No.: 15/514,996

(22) PCT Filed: Dec. 21, 2016

(86) PCT No.: PCT/US2016/068029
§ 371 (c)(1),
(2) Date: Mar. 28, 2017

(87) PCT Pub. No.: WO2017/112774
PCT Pub. Date: Jun. 29, 2017

(65) Prior Publication Data
US 2017/0328697 A1    Nov. 16, 2017

Related U.S. Application Data

(60) Provisional application No. 62/271,082, filed on Dec. 22, 2015.

(51) Int. Cl.
*G01B 3/22* (2006.01)
*G01B 21/04* (2006.01)
*G01B 5/012* (2006.01)

(52) U.S. Cl.
CPC ............... *G01B 3/22* (2013.01); *G01B 5/012* (2013.01); *G01B 21/045* (2013.01)

(58) Field of Classification Search
CPC .......... G01B 3/205; G01B 5/00; G01B 5/012; G01B 21/045; G01B 21/047; G01B 3/22; G01B 5/016
(Continued)

(56) References Cited

U.S. PATENT DOCUMENTS 4,817,362 A     4/1989   Archer
4,945,501 A  *  7/1990   Bell  ................. G01B 7/008
                                                   318/632

(Continued)

OTHER PUBLICATIONS

Jansson, "Sensor Signal Offset Compensation System for a CMM Touch Probe," U.S. Appl. No. 62/271,082, filed Dec. 22, 2015, 32 pages.

*Primary Examiner* — Yaritza Guadalupe
(74) *Attorney, Agent, or Firm* — Seed IP Law Group LLP

(57) ABSTRACT

A touch probe circuit comprises a displacement sensor having a sensor signal responsive to touch probe stylus displacement, an offset compensation controller, and a difference amplifier. The offset compensation controller provides a varying offset compensation signal to compensate drift in a rest-state signal component of the sensor signal. The difference amplifier inputs the offset compensation signal and the sensor signal and amplifies the difference therebetween to provide an offset compensated displacement signal, which is output to a touch trigger signal generating circuit that provides a touch signal when the stylus touches a workpiece, and is also output to the offset compensation controller. The offset compensation controller portion provides a feedback loop that inputs the offset compensated displacement signal and outputs a responsive low pass filtered offset compensation signal to the difference amplifier, in order to provide the offset compensated displacement signal.

24 Claims, 4 Drawing Sheets

(58) Field of Classification Search
USPC .......................................................... 33/503
See application file for complete search history.

(56) References Cited

U.S. PATENT DOCUMENTS

| | | | |
|---|---|---|---|
| 5,228,352 | A | 7/1993 | McMurtry et al. |
| 5,304,941 | A | 4/1994 | Tateishi |
| 5,526,576 | A | 6/1996 | Fuchs et al. |
| 5,569,464 | A | 10/1996 | Endo et al. |
| 6,198,298 | B1 | 3/2001 | Nishioki |
| 6,487,785 | B1 | 12/2002 | Ritz |
| 7,735,234 | B2 | 6/2010 | Briggs et al. |
| 7,792,654 | B2 | 9/2010 | Prestidge et al. |
| 7,812,736 | B2 | 10/2010 | Collingwood et al. |
| 8,140,287 | B2 | 3/2012 | Prestidge et al. |
| 2011/0004437 | A1 | 1/2011 | Wooldridge et al. |
| 2012/0213604 | A1* | 8/2012 | Gu ........................ G05B 19/402 409/131 |
| 2016/0223610 | A1* | 8/2016 | Hammerschmidt ......................... G01R 31/2829 |
| 2016/0252589 | A1* | 9/2016 | Raman ................ G01R 33/0029 324/224 |
| 2017/0328697 | A1* | 11/2017 | Jansson ..................... G01B 3/22 |
| 2018/0196405 | A1* | 7/2018 | Maekawa ............. G05B 19/404 |

\* cited by examiner

SENSOR SIGNAL OFFSET COMPENSATION SYSTEM FOR A CMM TOUCH PROBE

BACKGROUND

Technical Field

This disclosure relates to precision metrology, and more particularly to circuit configurations for use in touch probes used in coordinate measurement systems.

Description of the Related Art

Coordinate measurement systems, e.g. 1-dimensional or 3 dimensional measurement systems, such as coordinate measurement machines (CMM's), can obtain measurements of inspected workpieces by using a touch probe to trigger the reading of a coordinate measurement gauge when a stylus of the touch probe contacts a workpiece. One exemplary prior art CMM described in U.S. Pat. No. 5,526,576, (the '576 patent) which is hereby incorporated herein by reference in its entirety, includes a touch probe for contacting a workpiece, a movement mechanism comprising multiple drives for moving the touch probe, and an associated electronic system including features related to processing signals in or from the touch probe head.

Touch probes use various types of sensitive displacement sensors to sense deflection of the touch probe stylus for an indication that it has contacted a workpiece. One problem in touch probes is that the smallest possible deflections must be sensed from the smallest possible signal variations. However, the displacement sensor signals may drift or change for a number of reasons even when the stylus is not contacting a workpiece, that is, when the stylus and/or touch probe is in a rest state (as opposed to a state wherein the stylus is actively touching a workpiece). For example, a sensor signal may drift or change in a rest state due to changing temperature or moisture effects on the sensor, associated circuits, or surrounding structure; due a change in orientation of the touch probe (e.g. due to gravitational effects on the stylus or its suspension); due to mechanical hysteresis effects (e.g. when the stylus is deflected by a surface and then returned to the rest state); or due to vibrations effects, or the like. Measures must be taken to insure that such sensor signal drifts or changes are not confused with and/or do not interfere with identifying the desired small signal changes that indicate a stylus deflection initiated by workpiece contact.

Workpiece contact generally results in workpiece contact signals that change at a faster rate than rest state sensor signal drift due to various sources such as those outlined above. Therefore, the most common prior art method used to distinguish workpiece contact signals from rest state sensor signal drifts is to use high pass filtering on the displacement sensor signals in order to isolate the more rapidly changing workpiece contact signal component(s) from the more slowly changing rest state signal drift component(s). One exemplary method of displacement sensor signal processing that includes high pass filtering is described in the previously incorporated '576 patent, for example.

Another prior art method used to distinguish workpiece contact signals from rest state sensor signal drifts is disclosed in U.S. Pat. No. 6,487,785, (the '785 patent) which is hereby incorporated herein by reference in its entirety. The '785 patent discloses using an incremental corrector for changing a reference value that governs a "touch indicated" switching threshold. The incremental corrector uses a sequence of small incremental corrections that are governed by a measurement of a system parameter (e.g. a displacement sensor output) when the touch element is in repose (that is, during the rest state).

Another prior art method used to distinguish workpiece contact signals from one particular type of rest state sensor signal drift due to temperature is known. The method includes providing a "dummy" sensor and/or related circuit corresponding to the displacement sensor in the touch probe. The dummy sensor is isolated from displacement. In such a configuration, the dummy sensor may exhibit sensor signal drift due to some causes (e.g. temperature changes) that approximate the rest state sensor signal drift due to the same causes. The dummy sensor signal changes may therefore be used to compensate some of the rest state displacement sensor signal changes. However, it will appreciated that this method adds complexity to a touch probe assembly, and is not applicable to a number of causes or types of rest state sensor signal drift which are of practical significance.

Thus, it is desirable to improve upon the various prior methods used to isolate more rapidly changing workpiece contact signal component(s) from the more slowly changing rest state signal drift component(s), including the methods indicated above. For example, improvements in any or all of displacement signal isolation or discrimination, circuit response stability, circuit response time, circuit economy, ease of use and understanding, as well as increasing the universality of the solution for various types and models of touch probes and displacement sensors, would be desirable.

BRIEF SUMMARY

This summary is provided to introduce a selection of concepts in a simplified form to allow a more rapid recognition and understanding of the various disclosed features and principles that are further described below in the Detailed Description. This summary is therefore intended only as a brief overview and is not intended to isolate key features of the claimed subject matter, nor is it intended to be used as an aid in determining the scope of the claimed subject matter.

The previously indicated prior art methods for isolating more rapidly changing workpiece contact signal component(s) from the more slowly changing rest state signal drift component(s), including the methods indicated above, have been determined to have various undesirable aspects, for at least some applications.

For example, prior art methods including high pass filtering, such as that disclosed in the '576 patent for example, have been found to be undesirable in some applications due to the limitations they impose on amplification of a displacement sensor signal. As previously implied, to make a sensitive touch probe, the smallest possible stylus deflections must be quickly sensed from the smallest possible displacement sensor signal variations. Thus, it would generally be desirable to use a high gain amplifier to amplify the signals from the displacement sensor for detection. However, for various types of displacement sensors and/or their implementations in a touch probe, variations in a rest-state signal component output by the displacement sensor (e.g. various kinds sensor signal "drift" outlined above) can often exceed the variation in the displacement sensor signal due to the allowed amount of stylus deflection. This means that a desirable high gain amplification of the displacement sensor signal component due to deflection might amplify the relatively larger rest-state sensor signal component variations to reach the limits of the power supply, which is unacceptable.

Thus, the use of high gain amplification, which would otherwise be desirable for reasons outlined above, is unsuitable for various prior art methods that include high pass filtering for isolating more rapidly changing workpiece contact signal component(s) from the more slowly changing rest state signal drift component(s).

Prior art methods including adjustment of a touch trigger signal switching threshold to compensate for variations in a rest-state signal, or combination of rest-state signals, output by one or more displacement sensors have also been found to be undesirable in various applications. One such method is disclosed in the '785 patent for example. One problem with such methods is that in various touch probes it may be desirable to combine a plurality of displacement sensor signals in order to provide a combined signal that is compared to the touch trigger signal switching threshold. It should be appreciated that variations in the individual rest-state signal components of different displacement sensors may in fact be associated with a change in the relationship between the actual stylus deflection and the signal output by an individual displacement sensor. However, such variations in the individual rest-state signal component output by different displacement sensors may interact to become unpredictably lost or exaggerated in the processing that creates a combined signal for comparison to a touch trigger signal switching threshold. This may cause the actual stylus displacement that causes a trigger signal to become asymmetric or otherwise vary in its geometric form. Such effects make compensation of the switching level of a combined trigger signal undesirable as a means to compensate for variations in individual displacement sensor rest-state signals in various touch probe implementations. The '785 patent discloses one embodiment of a touch probe that uses a single displacement sensor, which avoids the aforementioned problem. However, the use of single displacement sensor for responding to multiple axes of stylus displacement introduces a separate set of problems, and has not found wide application. In addition, the method disclosed in the '785 patent wherein an incremental corrector uses a sequence of small incremental corrections that are governed by a rest state signal of the touch probe when the touch element is in repose, is disclosed as suitable for providing a correction that changes or is applied quite slowly. For example, the '785 patent states, "After the return of the touch pin 2 to its position of repose, the counter state of the digital counter of the logic component 23 is increased or decreased by one and counting step in slow cycles of at least one minute.") In contrast, it may be desirable in various implementations, for variations in the rest-state signal of a displacement sensor to be more rapidly corrected. For example, when the orientation of a touch probe is changed, the rest-state signal of a displacement sensor therein may immediately change (e.g. due to the changed gravity orientation changing the direction or amount of stylus deflection). From an inspection throughput perspective, it would be extremely undesirable to delay a subsequent touch probe measurement operation while waiting for the slow application of compensation for that in change the rest-state signal of a displacement sensor.

In order to overcome some or all of the foregoing problems, and provide other desirable features, various implementations of an improved touch probe circuit are disclosed herein. The touch probe circuit outputs a signal that contributes to the determination of a touch trigger signal, and is provided for use in a touch probe to be used in conjunction with a coordinate measurement system. The touch probe circuit comprises a displacement sensor, an offset compensation controller portion and a difference amplifier. The displacement sensor is configured to output a sensor signal that is responsive to displacement of stylus attached to the touch probe. The offset compensation controller portion is configured to provide a varying offset compensation signal that is used to compensate for variation in a rest-state signal component output by the displacement sensor. It should be appreciated that the compensated rest-state signal component may be the only signal component output by the displacement sensor during a rest state, but this signal component also persists in conjunction with a displacement sensor signal component that arises from a stylus deflection when the stylus contacts a workpiece, therefore the compensation of the rest-state signal component should continue during "non-rest" state operation of the touch probe. Accordingly, the difference amplifier is connected to input the offset compensation signal and the sensor signal and to amplify the difference between the input signals, and to output the amplified difference as an offset compensated displacement signal. The offset compensated displacement signal may be output to a trigger signal determination processing circuit to contribute to the determination of a touch trigger signal for the touch probe, and is also input to the offset compensation controller portion for use in adjusting the offset compensation signal. The offset compensation controller portion is configured to provide a feedback loop that inputs the offset compensated displacement signal and responds to that input to generate a low pass filtered offset compensation signal that is input to the difference amplifier to compensate an offset in the sensor signal due to the rest-state signal component.

In various implementations, the touch probe circuit comprises an analog-to-digital converter (A/D converter) nominally operating at M bits of resolution and the difference amplifier comprises an analog amplifier configured to output the offset compensated displacement signal to the A/D converter, which is configured to convert the offset compensated displacement signal into a corresponding digital offset compensated displacement signal that is output to the trigger signal determination processing circuit, and that is also input to the offset compensation controller portion for use in adjusting the offset compensation signal. In various implementations, the offset compensation controller portion comprises a digital-to-analog converter (D/A converter) nominally operating at N bits of resolution and the offset compensation controller portion comprises a digital circuit configured to input the digital offset compensated displacement signal and determine the value of a low pass filtered digital offset compensation signal that is input to the D/A converter, and the D/A converter is configured to convert the low pass filtered digital offset compensation signal into a corresponding analog offset compensation signal that is input to the difference amplifier. In various implementations, N is at least 2 bits larger than M. In various implementations, M is at least 12. In various implementations, M is at least 14 and N is at least as large as M. In various implementations, the offset compensation controller portion is configured to input the digital offset compensated displacement signal at a first sample rate and output the low pass filtered digital offset compensation signal at a second sample rate that is at least 10 times slower than the first sample rate. In various implementations, the second sample rate is at least 100 times slower than the first sample rate. In various implementations, the first sample rate is at least 50 KHz. In various implementations, the offset compensation controller portion comprises a digital low pass filter configuration that is configured to input the digital offset compensated displacement signal and output a low pass filter digital output signal, and a digital corrective feedback controller configured to input the low pass filter digital output signal and determine the value of the low pass filtered digital offset compensation signal that is input to the D/A converter. In various implementations, the digital corrective feedback controller is configured to operate as proportional integrating controller responsive to changes in the low pass filter digital output signal.

In various implementations, the difference amplifier is configured to provide a relatively higher bandwidth having a first cutoff frequency, and the offset compensation controller portion is configured to generate the low pass filtered offset compensation signal corresponding to a relatively lower bandwidth having a second cutoff frequency, wherein the second cutoff frequency is at least 1000 times lower than the first cutoff frequency. In various implementations, the second cutoff frequency is at least 5000 times lower than the first cutoff frequency. In various implementations, the first cutoff frequency is at least 5000 Hz and the second cutoff frequency is at most 5 Hz. In various implementations, the second cutoff frequency is at least 0.1 Hz. In various implementations, the offset compensation controller portion comprises a low pass filter configuration configured to input the offset compensated displacement signal and output a low pass filter output signal having the second cutoff frequency, and a corrective feedback controller configured to input the low pass filter output signal, and determine the level of the low pass filtered offset compensation signal that is generated and input to the difference amplifier. In various implementations, the corrective feedback controller is configured to operate as proportional integrating controller responsive to changes in the low pass filter output signal. In various implementations, the touch probe circuit comprises an analog-to-digital converter (A/D converter) nominally operating at M bits of resolution, the difference amplifier comprises an analog amplifier configured to output the offset compensated displacement signal to the A/D converter, which is configured to convert the offset compensated displacement signal into a corresponding digital offset compensated displacement signal that is output to the trigger signal determination processing circuit, and that is also input to the offset compensation controller portion for use in adjusting the offset compensation signal, the offset compensation controller portion comprises a digital-to-analog converter (D/A converter) nominally operating at N bits of resolution, and the offset compensation controller portion comprises a digital circuit configured to input the digital offset compensated displacement signal and determine the value of a low pass filtered digital offset compensation signal that has the second cutoff frequency and that is input to the D/A converter, and the D/A converter is configured to convert the low pass filtered digital offset compensation signal into a corresponding analog low pass filtered offset compensation signal that has the second cutoff frequency and that is input to the difference amplifier.

In various implementations, the offset compensation controller portion is further configured to hold the low pass filtered offset compensation signal that is input to the difference amplifier substantially constant during a time when the trigger signal determination processing circuit outputs a touch trigger signal corresponding to the stylus touching a workpiece. In some such implementations, the offset compensation controller portion is configured to receive an interrupt signal that is provided when the trigger signal determination processing circuit outputs a touch trigger signal corresponding to the stylus touching a workpiece, and is responsive to the interrupt signal to hold the low pass filtered offset compensation signal that is input to the difference amplifier substantially constant.

In various implementations, the touch probe circuit is included in a housing of the touch probe and at least a portion of the trigger signal determination processing circuit is located outside the housing of the touch probe. In other implementations, a plurality of the touch probe circuits, corresponding to a plurality of displacement sensors, are included in a housing of the touch probe, and the trigger signal determination processing circuit is located inside the housing of the touch probe, and the touch probe is configured to output a touch trigger signal corresponding to the stylus touching a workpiece. In various implementations, the displacement sensor may comprise a silicon strain gauge mounted on a flexure element that is used in a stylus suspension arrangement in the touch probe. However, the touch probe circuit and related concepts and methods disclosed herein are applicable to a wide variety of other types of displacement sensors suitable for use in a touch probe circuit.

DETAILED DESCRIPTION

Figure 1:
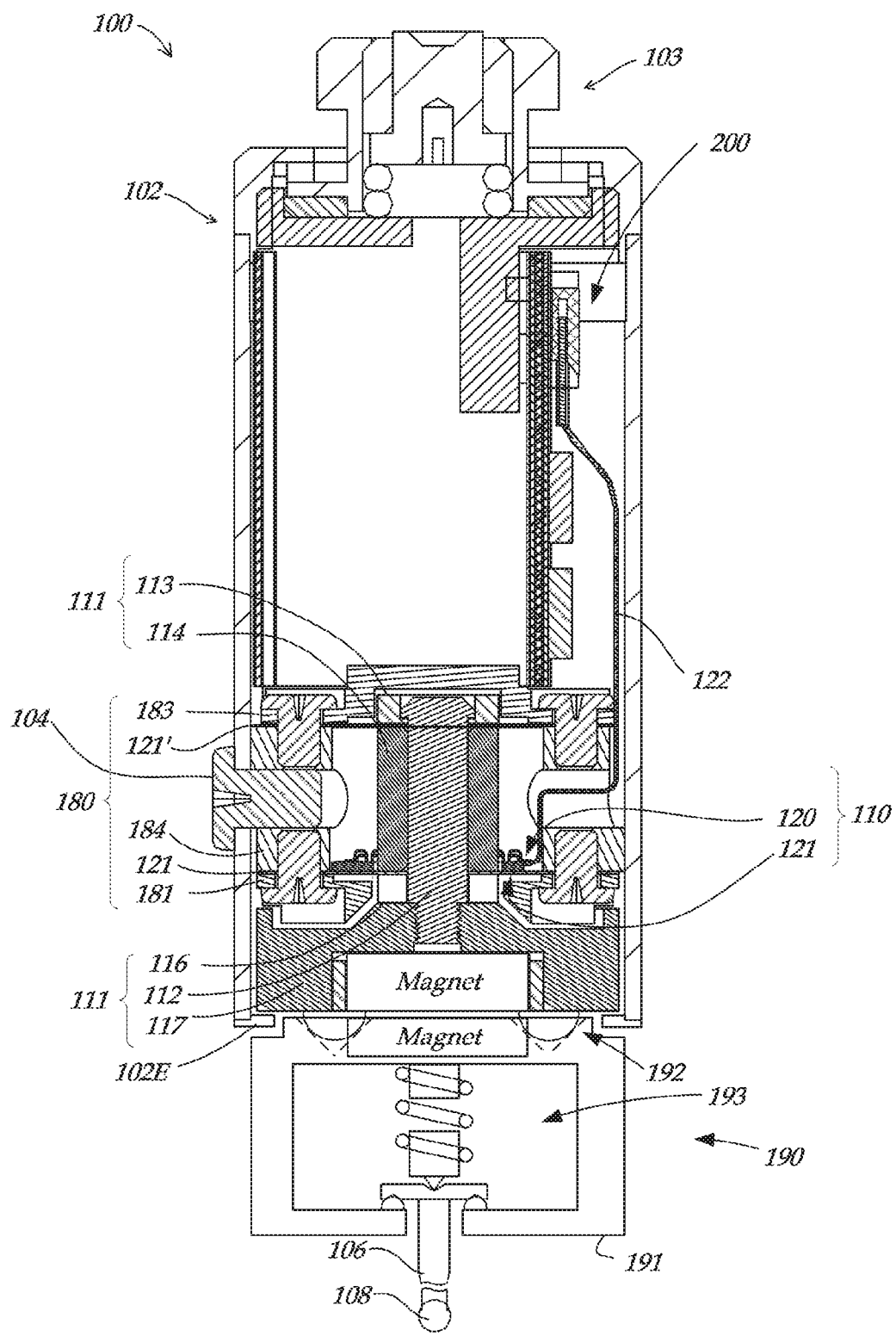
FIG. 1 is a partially schematic diagram showing a cross section of a touch probe having one implementation of a stylus suspension and sensor configuration that may be used in combination with various touch probe circuit configurations disclosed herein.

FIG. 1 is a partially schematic diagram showing a cross section of a touch probe 100 showing one exemplary implementations of a stylus suspension and sensing assembly comprising a displacement sensor configuration 110 and a stylus suspension configuration 180. The various mechanical features of the touch probe 100 may generally be provided according to principles known to one skilled in the art of touch probe design, and therefore are only described briefly here, in order to provide one exemplary context for use of the various touch probe circuit configurations disclosed herein.

The stylus suspension configuration 180 supports a moving assembly 111. The moving assembly 111 may in turn may support an interchangeable stylus module 190, as schematically illustrated in the example shown in FIG. 1 and described in greater detail below. The displacement sensor configuration 110 may be connected various touch probe circuit configurations disclosed herein (e.g. as represented in FIG. 1 by the touch probe circuit elements 200), as described in greater detail below.

In the embodiment illustrated in FIG. 1, the stylus suspension configuration 180 comprises a lower flexure element 121 which may be bonded to and/or clamped between a lower support element 181 and a spacing element 184 (e.g.

by using various clamping or assembly fasteners as schematically represented in FIG. 1, or by known bonding techniques, or the like). It may further comprise an upper flexure element 121' which may be similarly bonded to and/or clamped between an upper support element 183 and the spacing element 184. The stylus suspension configuration 180 may be fixed to a portion of touch probe housing 102 by fasteners or the like, as schematically represented in FIG. 1 by the representative fastener 104.

The example shown in FIG. 1, the moving assembly 111 is suspended from the upper and lower flexure elements 121 and 121'. In the particular implementation illustrated, the moving assembly 111 includes a stack of elements comprising an upper clamping ring 113, a spacing element 114, a lower clamping ring 116, and a clamping and capture element 117. A threaded clamping pin 112 is used to align and clamp the stack of elements together along the axial direction, with the upper flexure element 121' clamped between the upper clamping ring 113 and the spacing element 114, the lower flexure element 121 clamped between the lower clamping ring 116 and the spacing element 114. The lower clamping and capture element 117 may further comprise a magnet and other features of a known type of kinematic mounting arrangement 192, in order to mate with and support the interchangeable stylus module 190. Travel of the moving assembly 111 may be limited by limited clearances between it and various fixed surfaces of the touch probe, according to known methods (e.g. fixed surfaces of the stylus suspension configuration 180 and/or the housing end plate 102E, etc.) Limiting the travel of the moving assembly 111 prevents non-elastic deflection and damage of the flexure elements 121 and 121' and the strain gauges 120.

The schematically illustrated interchangeable stylus module 190 may be of a known type comprising a stylus 106 attached to an over-travel mechanism 193, which may deflect and repeatably reseat itself, according to known principles of touch probe design, to prevent damage to the stylus due to unexpected forces. The interchangeable stylus module 190 may further comprise a magnet and other features of a known type of kinematic mounting arrangement 192, in order to mate with corresponding features on the lower clamping and capture element 117 moving assembly 111.

Figure 2:
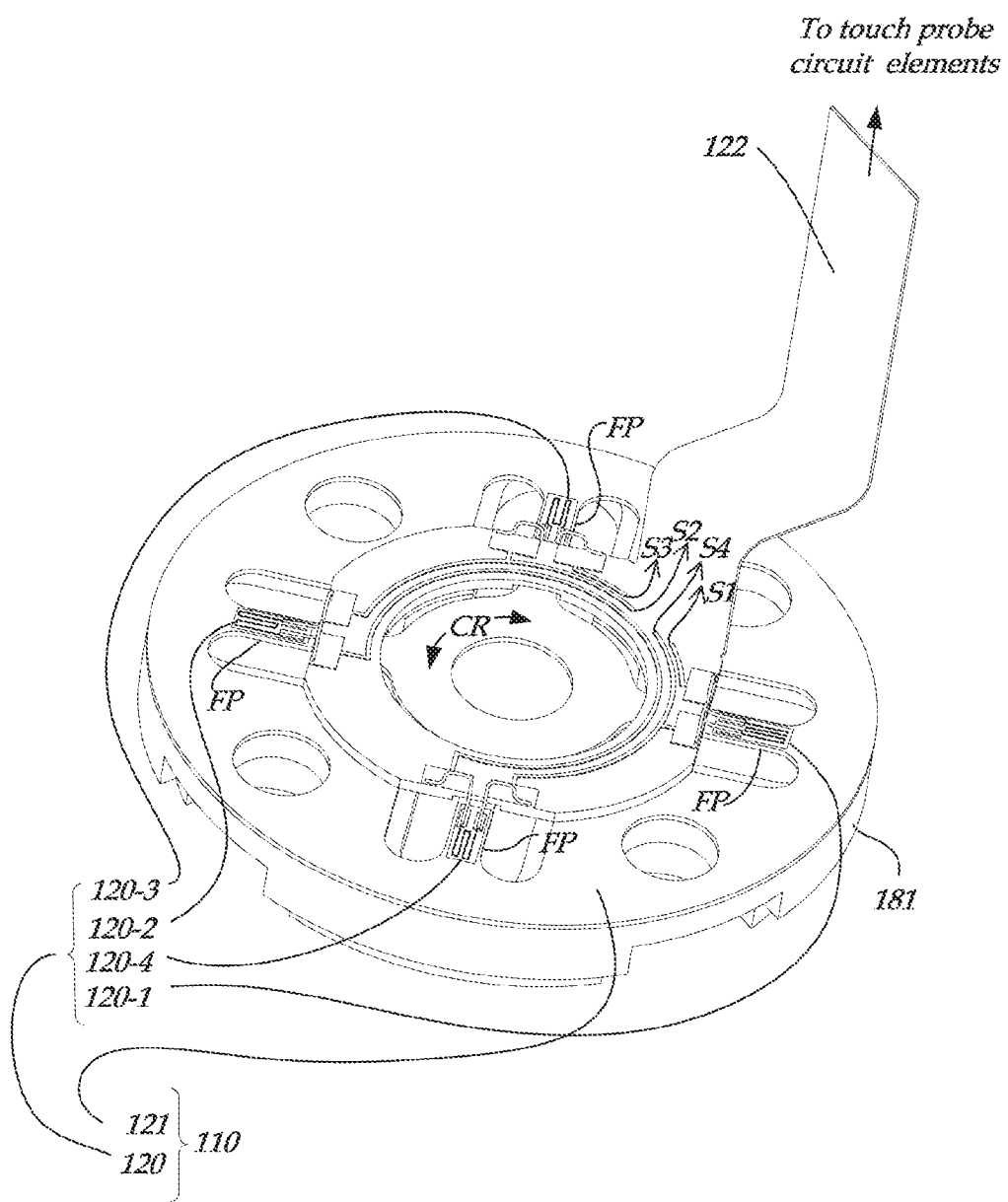
FIG. 2 is a partially schematic illustration showing one implementation of a displacement sensor configuration usable in the touch probe shown in FIG. 1.

It will be understood that the elements of the stylus suspension configuration 180 are configured such that the flexure portions of the flexure elements 121 and 121' (e.g. as best illustrated by the flexure portions FP on the flexure element 121 in FIG. 2) are unsupported and free to bend in the vicinity of the flexure gap regions FG indicated in FIG. 1. Since the stylus is connected to the central region of the flexure element and/or the flexure portions through the moving assembly 111, the flexure portions may be strained and/or displaced due to a force acting to deflect the stylus 106 when its contact portion 108 touches a workpiece. A suitable displacement sensor 120 (e.g. a strain gauge displacement sensor such as one of the strain gauges 120 best shown in FIG. 2) may detect the strain and/or displacement and provide a displacement sensor signal that is indicative of the stylus touching a workpiece. In the implementation shown in FIG. 1, displacement sensor signals are transmitted from the displacement sensor 120 through a connection 122 (e.g. a flex print connector as best seen in FIG. 2) to other elements of the touch probe circuit 200. A touch probe circuit 200 may be configured to various touch probe circuit principles disclosed further below. In some embodiments, one or more displacement sensors 120 may be considered to be an integral part of the touch probe circuit 200.

In one implementation, a touch probe circuit 200 is included in a housing of the touch probe and at least a portion of a trigger signal determination processing circuit is located outside the housing of the touch probe. Signals between the touch probe circuit 200 and an external trigger signal determination processing circuit may be exchanged through an electrical connection included in the connector portion 103 of the touch probe, or by any known wireless means such as those already used in various commercial touch probes.

In another implementation, a plurality of the touch probe circuits, corresponding to a plurality of displacement sensors, are included in a housing of the touch probe (e.g. as illustrated in various figures herein), and the trigger signal determination processing circuit may also be located inside the housing of the touch probe, and the touch probe is configured to output a touch trigger signal corresponding to the stylus touching a workpiece. Signals between such a trigger signal determination processing circuit and an external CMM host system, or the like, may be exchanged through an electrical connection included in the connector portion 103 of the touch probe, or by any known wireless means such as those already used in various commercial touch probes.

FIG. 2 is a partially schematic illustration showing one implementation of various elements shown in FIG. 1 in greater detail, including the displacement sensor configuration 110. It will be appreciated that certain numbered components 1XX of FIG. 2 may provide similar operations or functions as similarly numbered counterpart components 1XX of FIG. 1, and may be further understood by analogy thereto and as otherwise described below. In particular, as previously indicated with reference to FIG. 1, the lower flexure element 121 may be bonded to and/or clamped to the lower support element 181, to prevent distortion of the thin and planar lower flexure element 121. However, the lower support element 181 is also configured such that the flexure portions FP of the flexure element 121 are unsupported and free to bend (e.g. in the vicinity of the flexure gap regions FG best seen in FIG. 1). Since the stylus 106 is connected to the central region CR of the flexure element 121 and/or the flexure portions FP through the moving assembly 111, the flexure portions FP may be strained and/or displaced due to a force acting to deflect the stylus 106 when its contact portion 108 touches a workpiece. In the implementation shown in FIG. 2, strain gauge displacement sensors 120-1 through 120-4 are bonded to the various flexure portions FP to detect their strain and/or displacement and provide a displacement sensor signal that is indicative of the stylus contact portion 108 touching a workpiece. In the implementation shown in FIG. 2, displacement sensor signals S1-S4 are transmitted from the displacement sensor 120 through the flex print connector 122 to other elements of the touch probe circuit 200 in the touch probe 100.

Figure 3:
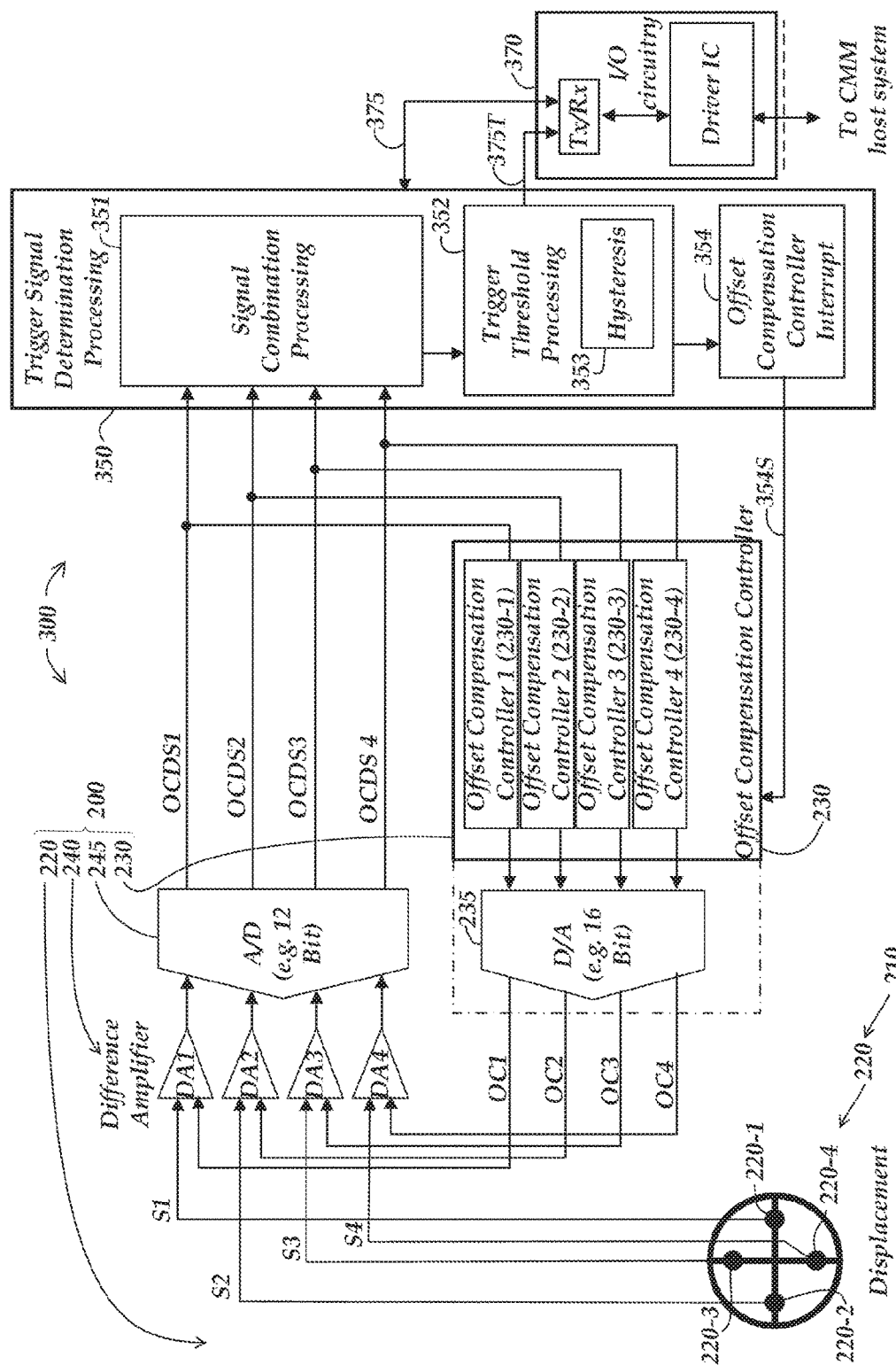
FIG. 3 is a block diagram showing various elements of a one implementation of touch probe electronic system as coupled to a coordinate measurement system, including a one implementation of a touch probe circuit configured according to principles disclosed herein.

FIG. 3 is a block diagram showing various elements of a one implementation of touch probe electronic system 300 as coupled to a coordinate measurement system (e.g. a CMM host system), including one exemplary embodiment or implementation of a touch probe circuit 200 configured according to principles disclosed herein. The touch probe electronic system 300 further includes one exemplary implementation of a touch trigger determination processing circuit 350. It will be appreciated that certain numbered components 2XX of FIG. 3 may provide similar operations or functions as similarly numbered counterpart components 1XX or 2XX of FIG. 1 and/or FIG. 2, and may be further understood by analogy thereto and as otherwise described below. This numbering scheme to indicate elements having analogous design and/or function applies in relation to the following FIG. 4.

In the implementation shown in FIG. 3, the touch probe circuit 200 comprises a plurality of displacement sensors 220-1 through 220-4, an offset compensation controller 230 comprising a plurality of individual offset compensation controller portions 230-1 through 230-4, and a plurality of difference amplifiers DA-1 through DA-4. It will be understood that the various elements with a similar "X" or "–X" designation (e.g. X=1, etc.) work together as implied by the connections shown in the figure to form individual touch probe circuit "channels" that may each operate in a manner similar to that described for "channel X=1" below.

In operation, the displacement sensor 220-1 is configured to output a sensor signal S1 that is responsive to displacement of stylus (e.g. the stylus 106) attached to the touch probe (e.g. the touch probe 100). The offset compensation controller portion 230-1 is configured to output a varying offset compensation signal OC1 (e.g. through the D/A converter 235, which in some embodiments is considered to be part of the offset compensation controller 230 and/or the offset compensation controller portion 230-1). The varying offset compensation signal OC1 from the offset compensation controller portion 230-1 is used to compensate for variation in a rest-state signal component output by the displacement sensor 220-1, as describe in greater detail below. The difference amplifier DA1 is connected to input the offset compensation signal OC1 from the offset compensation controller portion 230-1 and the displacement sensor signal S1, and to amplify the difference between the input signals. The amplified difference is output from the difference amplifier DA1 as an offset compensated displacement signal OCDS1 (e.g. through the A/D converter 245). The offset compensated displacement signal OCOS1 may be output through the A/D converter 245 to the trigger signal determination processing circuit 350, to contribute to the determination of a touch trigger signal (e.g. the signal 375T) for the touch probe, as described in greater detail below. The offset compensated displacement signal OCDS1 is also output through the A/D converter 245 to be input to the offset compensation controller portion 230-1 for use in adjusting the offset compensation signal that it outputs. In particular, the offset compensation controller portion 230-1 is configured to provide a feedback loop that inputs the offset compensated displacement signal OCDS1 and responds to that input to generate a low pass filtered offset compensation signal OC1 (e.g. through the D/A converter 235) that is input to the difference amplifier DA1 to compensate the offset in the displacement sensor signal S1 due to the rest-state signal component. The advantages of using this type of feedback loop to generate and apply a low pass filtered offset compensation signal OC1 at the difference amplifier DA1 have been previously outlined in the "brief summary" section of this disclosure, in comparison to the disadvantages of various known prior art methods of compensating the more slowly changing rest state signal drift component(s) in a displacement sensor signal in order to isolate the more rapidly changing workpiece contact signal component(s) in the displacement sensor signal.

It should be appreciated that based on the previous and following descriptions of the operating principles of various touch probe circuits disclosed herein, a touch probe circuit 200 may be implemented in either analog or digital circuits, or combination thereof, by one skilled in the art of electronic design. In various partially or completely analog circuit implementations the D/A converter 235 and/or the A/D converter 245 may be omitted. However, in various implementations, a digital circuit implementation of the offset compensation controller 230 and/or the offset compensation controller portion 230-1 may have various advantages. In such an implementation the touch probe circuit 200 may then advantageously comprise the A/D converter 245 and/or the D/A converter 235. In various implementations, the A/D converter 245 and/or the D/A converter 235 may convert a plurality of channels in parallel through parallel converter channels, or in other implementations they may multiplex the various channels for sequential conversion if the associated processing time is allowable in a particular implementation.

In various implementation the A/D converter 245 may nominally operate at M bits of resolution. The difference amplifier DA1 may comprises an analog amplifier configured to output the offset compensated displacement signal OCDS1 to the A/D converter 245, which is configured to convert the offset compensated displacement signal OCDS1 into a corresponding digital offset compensated displacement signal OCDS1 that is output to the trigger signal determination processing circuit 350, and that is also input to the offset compensation controller portion 230-1 for use in adjusting the offset compensation signal OC1. In various implementations, the offset compensation controller portion 230-1 comprises the D/A converter 235 nominally operating at N bits of resolution and the offset compensation controller portion 230-1 comprises a digital circuit configured to input the digital offset compensated displacement signal OCDS1 and determine the value of a low pass filtered digital offset compensation signal OC1 that is input to the D/A converter 235, and the D/A converter 235 is configured to convert the low pass filtered digital offset compensation signal OC1 into a corresponding low pass filtered analog offset compensation signal OC1 that is input to an analog difference amplifier DA1. In various implementations, it may be advantageous if N is at least 2 bits larger than M. This may be advantageous because, as previously indicated, for various types of displacement sensors and/or their implementations in a touch probe, variations in a rest-state signal component output by the displacement sensor (e.g. various kinds sensor signal "drift") can often exceed the variation in the displacement sensor signal due to the allowed amount of stylus deflection. This means that the low pass filtered analog offset compensation signal OC1 may be a large value in order to compensate a large rest-state signal component output by the displacement sensor. In contrast, the processing provided by the difference amplifier DA1, removes the large value of the low pass filtered analog offset compensation signal OC1 from its output, outputting only a relatively smaller valued signal offset compensated (analog) displacement signal OCDS1 corresponding to the variation in the displacement sensor signal due to the allowed amount of stylus deflection. As a result, in order to provide comparable signal resolution in the signals output from the D/A converter 235 and the A/D converter 245 and/or prevent undesirable jumps or "dithering" in the output of the A/D converter 245 due to insufficient resolution in the low pass filtered analog offset compensation signal OC1, it may be both most economical and advantageous in various implementations if N is at least 2 bits larger than M.

Furthermore, to provide a desirable level of resolution in the offset compensated digital displacement signal OCDS1, it may be advantageous in many applications M is at least 12. This suggest an alternative implementation that also may provide acceptable performance at the expense of processing efficiency and economy: In various implementations, if M is at least 14 and N is at least as large as M, then the least significant bits of the resulting offset compensated digital displacement signal OCDS1 may be truncated or ignored (e.g. in the trigger signal determination processing circuit 350).

The trigger signal determination processing circuit 350 may be implemented according to principles known to one skilled in the art of touch probe design. Therefore, it is only briefly described briefly here in one exemplary implementation, in order to provide context for use of the various touch probe circuit configurations disclosed herein. As previously outlined, and as shown in FIG. 3, it may be desirable in various touch probe implementations to combine a plurality of displacement sensor signals in order to provide a combined signal that is compared to a touch trigger signal switching threshold. Such an implementation may nicely complement certain economical suspension configurations, for example. Thus, as shown in FIG. 3, the trigger signal determination processing circuit 350 inputs four individual offset compensated digital displacement signals OCDS1-OSDS4, and includes a signal combination processing portion 351 that determines a combined displacement signal which is provided to a trigger threshold processing circuit 352. The trigger threshold processing circuit 352 defines a switching threshold value which is compared to the combined displacement signal. When the combined displacement signal exceeds the switching threshold value, the trigger threshold processing circuit 352 outputs a touch trigger signal 375T indicating the stylus has contacted a workpiece. The touch trigger signal 375T is communicated to a CMM host system or the like, e.g. through I/O circuitry 370, so that current measurement values in the host system can be recorded to indicate the present coordinates of the stylus and the measurement coordinates of the workpiece surface that it is contacting. The I/O circuitry 370 may also pass other control signals and/or parameters 375 between the host system and the trigger signal determination processing circuit 350, and/or various element of the touch probe circuit 200, in various embodiments.

The trigger threshold processing circuit 352 may include a known type of hysteresis circuit 353, which implements hysteresis in relation to the defined a switching threshold value such that the touch trigger signal 375T is not removed or negated until the combined displacement signal falls a predetermined amount below the switching threshold value. This prevents the touch trigger signal 375T from dithering on and off when the stylus is marginally contacting/not-contacting the workpiece surface.

The trigger signal determination processing circuit 350 may further include an offset compensation controller interrupt signal generating circuit 354, which may receive the touch trigger signal touch trigger signal 375T or a related signal from the trigger threshold processing circuit 352, and send an interrupt signal 354S to the offset compensation controller 230 to interrupt or freeze its effects, as described in greater detail below. This insures that the offset compensation controller 230 does not operate to compensate a displacement sensor signal variation due to a sustained workpiece contact signal component(s) in the displacement sensor signal, which would be improper and undesirable type of operation.

The foregoing outline of exemplary operations of the trigger signal determination processing circuit 350 may be further understood and implemented based on study and application of various relevant materials currently available in the art of touch probe design. For example, one exemplary trigger signal determination processing circuit and method including methods of signal combination processing as well as switching threshold definition is described in U.S. Pat. No. 7,792,654, (the '654 patent), which is hereby incorporated herein by reference in its entirety.

Figure 4:
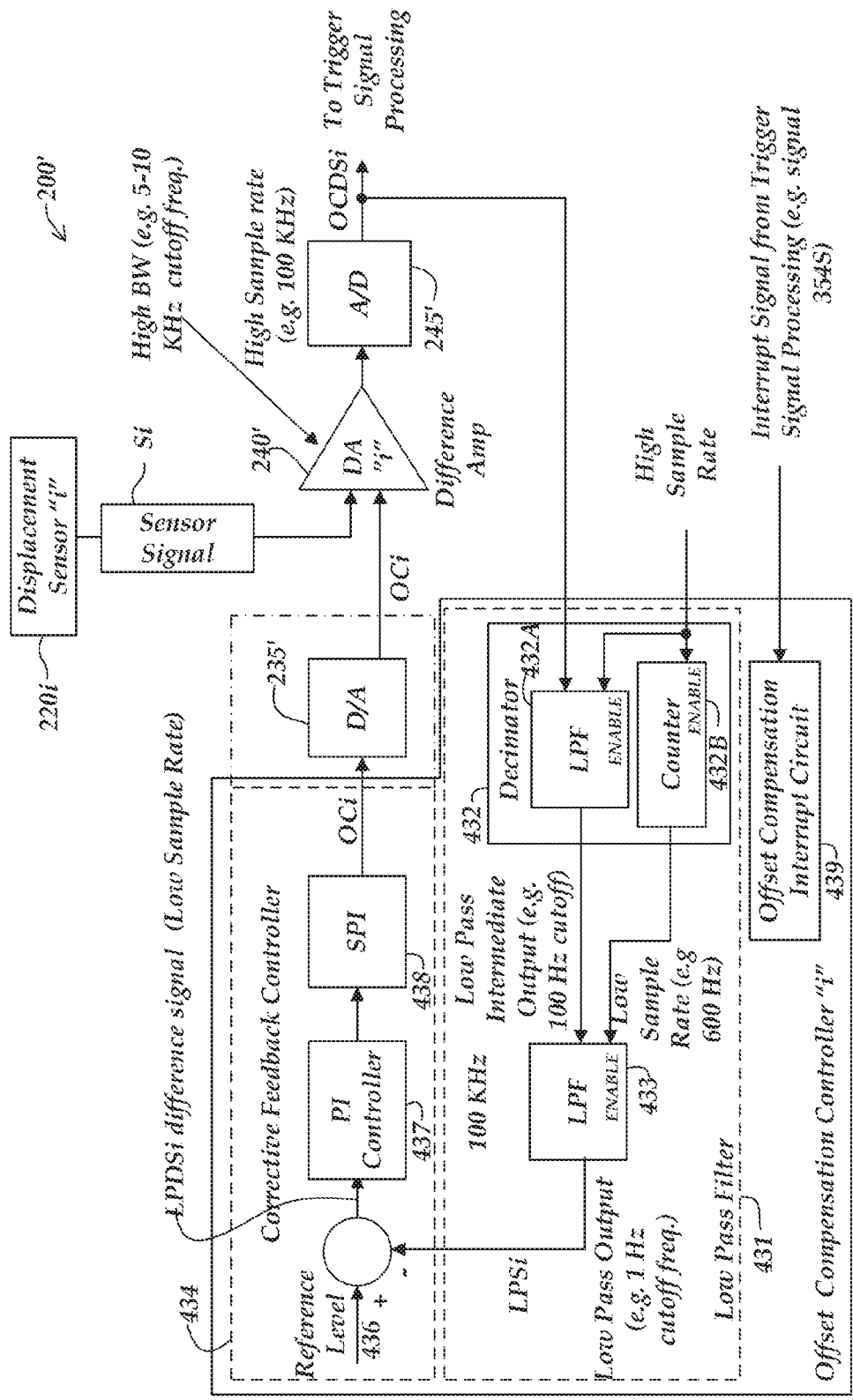
FIG. 4 is a block diagram showing certain aspects of one embodiment of the touch probe circuit shown in FIG. 3 in greater detail.

FIG. 4 is a block diagram showing certain aspects of one embodiment of a touch probe circuit 200' usable as the touch probe circuit 200 previously described with reference to FIG. 3, in greater detail. It will be appreciated that certain numbered components 2XX or 2XX' of FIG. 4 may correspond to and/or have provide similar operations or functions as similarly numbered counterpart components 1XX or 2XX of FIG. 1, FIG. 2, and/or FIG. 3, and may be further understood by analogy thereto and as otherwise described below. It will be understood that the various elements shown in FIG. 4 work together as implied by the illustrated connections to form an individual touch probe circuit "channel". As previously described with reference to FIG. 3, additional touch probe circuit channels may be included in a in touch probe that each operate in a manner similar to that described for the channel shown FIG. 4 and described below.

In the implementation shown in FIG. 4, the touch probe circuit 200' comprises a displacement sensor 220$i$, an offset compensation controller 230', and a difference amplifiers DAi. In operation, the displacement sensor 220$i$ is configured to output a sensor signal S1 that is responsive to displacement of stylus (e.g. the stylus 106) attached to the touch probe. The offset compensation controller portion 230$i$ is configured to output a varying offset compensation signal OCi through the D/A converter 235', which in some embodiments is considered to be part of the offset compensation controller 230$i$ and/or its included corrective feedback controller 434, described further below. The varying offset compensation signal OCi from the offset compensation controller portion 230$i$ is used to compensate for variation in a rest-state signal component output by the displacement sensor 220$i$. The difference amplifier DAi is connected to input the analog offset compensation signal OCi from the D/A converter 235' and the displacement sensor signal S1, and to amplify the difference between the input signals. The amplified difference is output from the difference amplifier DAi as an offset compensated displacement signal OCDSi through the A/D converter 245 to be used for trigger signal processing (e.g. as previously described with reference to FIG. 3). The offset compensated displacement signal OCDSi is also input to the offset compensation controller portion 230$i$ for use in adjusting the offset compensation signal OCi that it outputs. According to this description, the offset compensation controller portion 230$i$ is configured to provide a feedback loop that inputs the offset compensated displacement signal OCDSi and responds to that input to generate a low pass filtered offset compensation signal OCi that is input to the difference amplifier DAi to compensate the offset in the displacement sensor signal S1 due to the rest-state signal component.

In this particular implementation the offset compensation controller portion 230$i$ comprises a digital low pass filter configuration 431 that is configured to input the offset compensated digital displacement signal OCDSi and output a low pass filter digital output signal LPSi. The offset compensation controller portion 230$i$ further comprises a digital corrective feedback controller 434 configured to input the low pass filter digital output signal LPSi and determine the value of the low pass filtered digital offset compensation signal OCi that is input to the D/A converter 235' and output from the D/A converter 235' as a low pass filtered analog offset compensation signal OCi that is input to the difference amplifier DAi. In the particular implementation shown in FIG. 4, the digital corrective feedback controller 434 is configured to operate as proportional integrating controller responsive to changes in the low pass filter digital output signal LPSi. As shown, the low pass filter digital output signal LPSi is input to the corrective feedback controller 434 and a low pass difference signal LPDSi is determined relative to a defined reference level 436. The low pass difference signal LPDSi may be input to a known type of digital proportional integrating (PI) controller 437 (e.g. an IIR type PI controller modeled on an analog PI controller according to known methods.) The PI parameters may be chosen by trial and error or analysis to provide the desired tradeoffs between loop stability, sufficiently fast settling time, and good accuracy of the offset compensation signal. In the illustrated implementation the PI controller 437 determines the value of the low pass filtered digital offset compensation signal OCi, which is transferred to the D/A converter 235' through a serializer 438. It will be appreciated that this configuration of the digital corrective feedback controller 434 is exemplary only, and not limiting.

Regarding the operation of the digital low pass filter configuration 431, we first note that it may be advantageous in various implementations that the difference amplifier DAi is configured to provide a relatively higher bandwidth having a first cutoff frequency, and the offset compensation controller 230' is configured to generate the low pass filtered offset compensation signal OCi corresponding to a relatively lower bandwidth having a second cutoff frequency. For example, in some implementations the second cutoff frequency may be least 1000 times lower than the first cutoff frequency, for the purpose of compensating the more slowly changing rest state signal drift component(s) in a displacement sensor signal and isolating and amplifying the more rapidly changing workpiece contact signal component(s) in the displacement sensor signal. For example the first cutoff frequency (of the difference amplifier Dai) may be at least 5000 Hz and the second cutoff frequency (of the offset compensation controller 230') is at most 5 Hz. In other implementations, it may be advantageous if the second cutoff frequency is at least 5000 times, or more, lower than the first cutoff frequency. For example the first cutoff frequency (of the difference amplifier Dai) may be at least 10000 Hz and the second cutoff frequency (of the offset compensation controller 230') is at most 2 Hz. In various implementations, the second cutoff frequency may be at least 0.1 Hz to insure that various undesirable "less-slowly changing" rest state signal drift component(s) are compensated.

In the implementation shown in FIG. 4, the operation of the digital low pass filter configuration 431 may provide the advantageous features outlined above. In various implementations, the digital low pass filter configuration 431 is configured to input the digital offset compensated displacement signal at a first "high" sample rate that is sufficient to prevent aliasing of the signal offset compensated digital displacement signal OCDSi (for example 50 KHz, or 100 KHz sample rates are easily achievable. The digital low pass filter configuration 431 may have a "first stage" comprising a decimator 432 that includes a counter 432B and a known type of digital low pass filter 432A (e.g. a $3^{rd}$ order Butterworth IIR filter) enabled at the desired sample rate. The decimator 432 may be configured to provide an "intermediate" low pass output (e.g. having an intermediate effective cutoff frequency of 100 Hz) to a "second stage" low pass filter 433. The low pass filter 433 is configured to input the "intermediate" low pass output at a reduced "low" sample rate that is sufficient to prevent aliasing "intermediate" low pass output (e.g. 600 Hz). This may be established by the reduced "low" sample rate enable signal provided from the counter 432B. In some embodiments, the digital low pass filter 433 may be a known type similar to the previously described digital low pass filter low pass filter 432A. The digital low pass filter 433 may provide a "final" low pass output having a desired low pass cutoff frequency (e.g. at least 0.5 Hz and at most 5 Hz, or 2 Hz, or 1 Hz, or the like). The low pass filter 431 prevents the aliasing of higher frequency signals (e.g. due to vibration) into lower frequencies that might otherwise undesirably influence the offset compensation signal OCi.

It may be seen from the above description that the low pass filter 431 may output the low pass filter digital output signal LPSi at a second sample rate (the low sample rate) that is at least 10 times, or even 100 times or more, slower than the first sample rate (the low sample rate). The corrective feedback controller 434 and the D/A converter 235' may also operate at the same low sample rate, which may simplify the design of the corrective feedback controller 434 and/or the offset compensation controller 230'.

In various implementations, the A/D converter 245' may nominally operate at M bits of resolution, and the D/A converter 235' may nominally operate at N bits of resolution, according to principles and relationships previously outline with reference to FIG. 3.

In various implementations, the offset compensation controller portion 230' is further configured to include an offset compensation interrupt circuit 439, which may receive the previously outlined interrupt signal 354S or the like, and is configured control the offset compensation controller 230' to hold the low pass filtered offset compensation signal OCi that is input to the difference amplifier substantially constant during a time when the trigger signal determination processing circuit outputs a touch trigger signal corresponding to the stylus touching a workpiece. In some such implementations, the offset compensation interrupt circuit 439 is configured to respond to the interrupt signal 354S or the like by blocking the low sample rate enable signal that is provided to the low pass filter 433. The low pass filter 433 may be configures such that this effectively holds the low pass filter digital output signal LPSi at a constant value, and the corrective feedback controller 434 then responds by hold the low pass filtered offset compensation signal OCi at a constant value, as desired. When the interrupt signal 354S or the like is ended, the offset compensation interrupt circuit 439 unblocks the low sample rate enable signal that is provided to the low pass filter 433, and the previously outlined variable compensation operation of the offset compensation controller 230' resumes.

In various implementations, the displacement sensor may comprise a silicon strain gauge mounted on a flexure element that is used in a stylus suspension arrangement in the touch probe. However, the touch probe circuit and related concepts and methods disclosed herein are applicable to a wide variety of other types of displacement sensors suitable for use in a touch probe circuit.

While preferred implementations of the present disclosure have been illustrated and described, numerous variations in the illustrated and described arrangements of features and sequences of operations will be apparent to one skilled in the art based on this disclosure. For example, in various implementations, the displacement sensor may comprise a silicon strain gauge mounted on a flexure element that is used in a stylus suspension arrangement in the touch probe as illustrated herein. However, the touch probe circuits and related concepts and methods disclosed herein are not so limited, rather, they are applicable to a wide variety of other known types of displacement sensors suitable for use in a touch probe circuit—including but not limited to other types of strain gauges, piezoelectric elements, or optical, capacitive, magnetic or inductive displacement sensors.

Various alternative forms may be used to implement the principles disclosed herein. In addition, the various implementations described above can be combined to provide further implementations. All of the U.S. patents and U.S. patent applications referred to in this specification, are incorporated herein by reference, in their entirety. Aspects of the implementations can be modified, if necessary to employ concepts of the various patents and applications to provide yet further implementations.

The disclosure of U.S. provisional patent application Ser. No. 62/271,082, filed Dec. 22, 2015, is incorporated herein in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A touch probe circuit that outputs a signal that contributes to the determination of a touch trigger signal, in a touch probe for use in a coordinate measurement system, the touch probe circuit comprising:
a displacement sensor configured to output a sensor signal that is responsive to displacement of stylus attached to the touch probe;
an offset compensation controller portion configured to provide a varying offset compensation signal that is used to compensate for variation in a rest-state signal component output by the displacement sensor;
a difference amplifier connected to input the offset compensation signal and the sensor signal and to amplify the difference between the input signals, and to output the amplified difference as an offset compensated displacement signal, wherein the offset compensated displacement signal is output to a trigger signal determination processing circuit to contribute to the determination of a touch trigger signal for the touch probe, and is also input to the offset compensation controller portion for use in adjusting the offset compensation signal;
wherein,
the offset compensation controller portion is configured to provide a feedback loop that inputs the offset compensated displacement signal and responds to that input to generate a low pass filtered offset compensation signal that is input to the difference amplifier to compensate an offset in the sensor signal due to the rest-state signal component.

2. The touch probe circuit of claim 1, wherein:
the touch probe circuit comprises an analog-to-digital converter (A/D converter) nominally operating at M bits of resolution; and
the difference amplifier comprises an analog amplifier configured to output the offset compensated displacement signal to the A/D converter, which is configured to convert the offset compensated displacement signal into a corresponding digital offset compensated displacement signal that is output to the trigger signal determination processing circuit, and that is also input to the offset compensation controller portion for use in adjusting the offset compensation signal.

3. The touch probe circuit of claim 2, wherein the offset compensation controller portion comprises a digital-to-analog converter (D/A converter) nominally operating at N bits of resolution; and
the offset compensation controller portion comprises a digital circuit configured to input the digital offset compensated displacement signal and determine the value of a low pass filtered digital offset compensation signal that is input to the D/A converter, and the D/A converter is configured to convert the low pass filtered digital offset compensation signal into a corresponding analog offset compensation signal that is input to the difference amplifier.

4. The touch probe circuit of claim 3, wherein N is at least 2 bits larger than M.

5. The touch probe circuit of claim 4, wherein M is at least 12.

6. The touch probe circuit of claim 3, wherein M is at least 14 and N is at least as large as M.

7. The touch probe circuit of claim 3, wherein the offset compensation controller portion is configured to input the digital offset compensated displacement signal at a first sample rate and output the low pass filtered digital offset compensation signal at a second sample rate that is at least 10 times slower than the first sample rate.

8. The touch probe circuit of claim 7, wherein the second sample rate is at least 100 times slower than the first sample rate.

9. The touch probe circuit of claim 7, wherein the first sample rate is at least 50 KHz.

10. The touch probe circuit of claim 3, wherein the offset compensation controller portion comprises:
a digital low pass filter configuration that is configured to input the digital offset compensated displacement signal and output a low pass filter digital output signal; and
a digital corrective feedback controller configured to input the low pass filter digital output signal and determine the value of the low pass filtered digital offset compensation signal that is input to the D/A converter.

11. The touch probe circuit of claim 10, wherein the digital corrective feedback controller is configured to operate as proportional integrating controller responsive to changes in the low pass filter digital output signal.

12. The touch probe circuit of claim 1, wherein the difference amplifier is configured to provide a relatively higher bandwidth having a first cutoff frequency, and the offset compensation controller portion is configured to generate the low pass filtered offset compensation signal corresponding to a relatively lower bandwidth having a second cutoff frequency, wherein the second cutoff frequency is at least 1000 times lower than the first cutoff frequency.

13. The touch probe circuit of claim 12, wherein the second cutoff frequency is at least 5000 times lower than the first cutoff frequency.

14. The touch probe circuit of claim 12, wherein the first cutoff frequency is at least 5000 Hz and the second cutoff frequency is at most 5 Hz.

15. The touch probe circuit of claim 14, wherein the second cutoff frequency is at least 0.1 Hz.

16. The touch probe circuit of claim 12, wherein the offset compensation controller portion comprises:

a low pass filter configuration configured to input the offset compensated displacement signal and output a low pass filter output signal having the second cutoff frequency; and a corrective feedback controller configured to input the low pass filter output signal, and determine the level of the low pass filtered offset compensation signal that is generated and input to the difference amplifier.

17. The touch probe circuit of claim 16, wherein the corrective feedback controller is configured to operate as proportional integrating controller responsive to changes in the low pass filter output signal.

18. The touch probe circuit of claim 12, wherein:

the touch probe circuit comprises an analog-to-digital converter (A/D converter) nominally operating at M bits of resolution;

the difference amplifier comprises an analog amplifier configured to output the offset compensated displacement signal to the A/D converter, which is configured to convert the offset compensated displacement signal into a corresponding digital offset compensated displacement signal that is output to the trigger signal determination processing circuit, and that is also input to the offset compensation controller portion for use in adjusting the offset compensation signal;

the offset compensation controller portion comprises a digital-to-analog converter (D/A converter) nominally operating at N bits of resolution; and the offset compensation controller portion comprises a digital circuit configured to input the digital offset compensated displacement signal and determine the value of a low pass filtered digital offset compensation signal that has the second cutoff frequency and that is input to the D/A converter, and the D/A converter is configured to convert the low pass filtered digital offset compensation signal into a corresponding analog low pass filtered offset compensation signal that has the second cutoff frequency and that is input to the difference amplifier.

19. The touch probe circuit of claim 1, wherein:

the offset compensation controller portion is further configured to hold the low pass filtered offset compensation signal that is input to the difference amplifier substantially constant during a time when the trigger signal determination processing circuit outputs a touch trigger signal corresponding to the stylus touching a workpiece.

20. The touch probe circuit of claim 19, wherein:

the offset compensation controller portion is configured to receive an interrupt signal that is provided when the trigger signal determination processing circuit outputs a touch trigger signal corresponding to the stylus touching a workpiece, and is responsive to the interrupt signal to hold the low pass filtered offset compensation signal that is input to the difference amplifier substantially constant.

21. The touch probe circuit of claim 1, wherein the touch probe circuit is included in a housing of the touch probe and at least a portion of the trigger signal determination processing circuit is located outside the housing of the touch probe.

22. The touch probe circuit of claim 1, wherein the touch probe circuit is included in a housing of the touch probe and at least a portion of the trigger signal determination processing circuit is located inside the housing of the touch probe.

23. The touch probe circuit of claim 22, wherein a plurality of the touch probe circuits, corresponding to a plurality of displacement sensors, are included in a housing of the touch probe, and the trigger signal determination processing circuit is located inside the housing of the touch probe, and the touch probe is configured to output a touch trigger signal corresponding to the stylus touching a workpiece.

24. The touch probe circuit of claim 1, wherein the displacement sensor comprises a silicon strain gauge mounted on a flexure element that is used in a stylus suspension arrangement in the touch probe.

* * * * *